May 29, 1962     B. M. FINGERUT     3,036,858
FLEXIBLE MOUNTING MEANS FOR TRACTOR GUARD CANOPY
Filed July 17, 1961
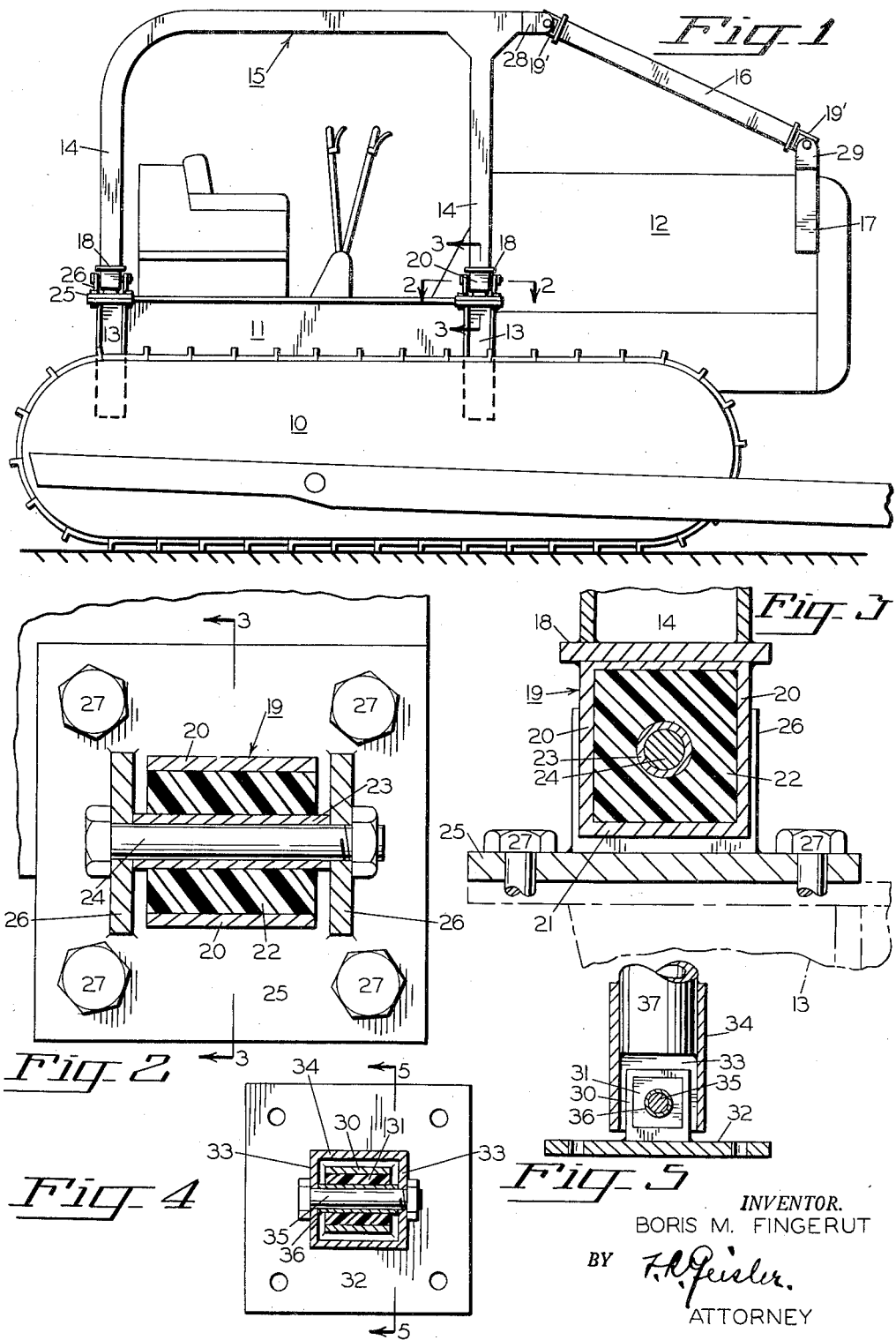
INVENTOR.
BORIS M. FINGERUT
BY F. R. Geisler
ATTORNEY

United States Patent Office 3,036,858
Patented May 29, 1962

3,036,858
FLEXIBLE MOUNTING MEANS FOR TRACTOR GUARD CANOPY
Boris M. Fingerut, Clackamas County, Oreg., assignor to Portland Wire & Iron Works, Portland, Oreg., a corporation of Oregon
Filed July 17, 1961, Ser. No. 124,667
5 Claims. (Cl. 296—102)

This invention relates to guard canopies which are customarily installed on track-laying or rubber tired tractors when the tractors are employed under such conditions or in such locations that guard canopies are necessary for protecting the operator of the tractor against falling timbers, trees, etc., or for protection against injury from the overturning of the tractor.

Such tractor guard canopies customarily comprise strong rigid frame structures including four vertical posts integrally connected at the top by longitudinal and transverse frame members, which in turn support a suitable top cover structure extending over the driver's location. The main frames of such tractor guard canopies generally are formed from metal tubing so as to give the necessary strength and rigidity to the frame in comparison to the amount of metal used, the metal tubing being either circular or, preferably, square in cross section. Also it is customary to have forwardly and downwardly sloping side deflector bars extending from the forward end of the top of the guard canopy frame down to the front end of the engine housing, which deflector bars not only serve as a possible protection to the tractor engine and aid in stabilizing the main portion of the guard canopy, but also cause tree branches and other obstacles, when encountered by the tractor, to be deflected upwardly so as to pass over the top of the canopy as the tractor moves forwardly beneath them.

It has been customary heretofore to secure the main integral frame of the guard canopy to the body of the tractor by rigid securing means, such, for example, as the employment of a pair of cooperating members for securing each guard canopy post to the tractor, with each pair of cooperating members being welded or otherwise rigidly secured to the tractor and to the bottom of the canopy post respectively, and then bolting such pair of cooperating members firmly together when mounting the guard canopy in place. However, due to the fact that some very slight flexing or twisting of the tractor frame necessarily occurs from time to time as the heavy tractor passes over rough ground and encounters obstacles, in spite of the fact that the tractor frame is substantially rigid, such slight relative movements between different portions of the tractor frame are then transmitted to the corresponding portions of the guard canopy frame through the customary rigid unyielding connections between canopy frame and tractor body. This explains why failures and breaks in certain parts of such guard canopy frames are common occurrence after a period of use with the tractor. These failures or breaks in the canopy frame necessitate immediate repairing by welding or replacement, and this involves loss of working time as well as repair expense. The present invention has been developed in order to enable the occurrence of such failures in the rigid frames of such guard canopies to be avoided.

I have found, after considerable experimenting and testing, that the substitution of special mounting means for securing the guard canopy frame to the tractor, in which means a limited amount of flexibility or relative movement between the connected elements is provided, will enable the occurrence of breaks or failures in the rigid frame of the guard canopy to be avoided to a very large extent in spite of the most vigorous employment of the tractor, and also without in any way rendering the guard canopy less effective in furnishing the protection desired.

The object of this invention accordingly is to provide improved mounting means for securing the tractor guard canopy in place which will allow necessary but limited amount of flexibility in the connections between guard canopy frame and tractor frame.

Since the slight flexing which may take place in the tractor frame, and which would ordinarily be transmitted to the guard canopy frame, could occur in any direction, a related specific object of the invention is to provide improved mounting means which will accommodate and absorb slight relative movements in any and all directions between the connected parts in such mounting means while still holding the guard canopy frame firmly in position on the tractor.

An additional object is to provide flexible mounting means for guard canopies for tractors which will be simple in construction, relatively inexpensive to manufacture, easy to install as an attachment on ordinary tractor guard canopies, and not involved with any particular maintenance problem.

These objects and incidental advantages I have been able to obtain by the employment of simple, cooperating metal mounting elements so arranged that a slight spacing between the metal elements will be maintained through the intermediary of a resilient bushing, as hereinafter briefly described with reference to the accompanying drawings.

In the drawings:

FIG. 1 is a side elevation, partly diagrammatic, showing the guard canopy mounted in place on a tractor through the medium of the flexible mounting means of the present invention;

FIG. 2 is a section on line 2—2 of FIG. 1, thus taken through the foot of one of the vertical posts of the guard canopy frame, drawn to a considerably larger scale;

FIG. 3 is a fragmentary sectional elevation taken on line 3—3 of FIG. 1 and also on the line indicated at 3—3 in FIG. 2, and drawn to the same scale as FIG. 2;

FIG. 4 is a section similar to FIG. 2 but drawn to a smaller scale and illustrating a modified arrangement of similar cooperating elements comprising the flexible mounting means; and FIG. 5 is a sectional elevation of this modified arrangement taken on line 5—5 of FIG. 4 and drawn to the same scale as FIG. 4.

In FIG. 1 the reference 10 indicates in general a common track-laying tractor for which a guard canopy is required, the tractor having the usual elongated main frame 11 and an engine housing 12. As is customary, suitable support brackets 13 have been rigidly mounted on the main frame of the tractor at four places at which the bottoms of the four posts of the guard canopy frame are located.

In FIG. 1 the rigid integral frame structure of the guard canopy is indicated as a whole by the reference 15, and the near side pair of the four posts of the guard canopy are shown at 14. A pair of deflector bars 16, one of which is shown in FIG. 1, are connected to the front of the main frame 15 of the guard canopy and extend downwardly and forwardly to a pair of mounts 17 located on opposite sides of the forward end of the engine housing 12. In the guard canopy as illustrated in FIG. 1 the main frame is shown integrally formed of metal tubing which is square in cross section, the forward side deflector bars 16 also being made of the same metal tubing. It is to be understood however that the guard canopy might also be made similarly of metal tubing which is circular in cross section.

In the carrying out of the invention a bushing housing is used. The housing is preferably rectangular in shape, is open on two sides, with two opposite vertical walls on the other two sides, and the opposite vertical walls are integrally connected to the bottom wall. In the arrangement shown in FIGS. 1, 2 and 3 this bushing housing 19 is secured to the bottom of each of the four posts of the guard canopy. The two side walls of the housing 19 are indicated at 20 and the bottom wall at 21. Preferably, but not necessarily, the housing 19 has approximately the same outside dimensions in cross section as the metal tubing from which the main frame of the guard canopy is made.

A bushing 22 (FIGS. 2 and 3) of rubber, or similar suitable resilient material, fills the housing 19. The bushing is bonded to the housing by vulcanization or other suitable means. A central channel is provided through the bushing parallel to the side walls 20 and parallel to the bottom wall 21 of the housing 19. A tubular metal sleeve 23 extends through this channel and the bushing is similarly bonded to the outside of the metal sleeve. The ends of the sleeve 23 terminate a short distance beyond the bushing and housing. Thus the housing 19, bushing 22 and sleeve 23 constitute an integrated assembly. The shaft of a mounting bolt 24 extends through the sleeve 23, the outside diameter of the bolt shaft corresponding to the inside diameter of the sleeve 23. In the arrangement shown in FIGS. 1, 2 and 3 the housing is welded to, or formed integral with a top plate 18 and the housing assembly, including plate 18 is secured to the bottom of the guard canopy post by welding.

The other portion of the mounting assembly includes a base plate 25 which is rigidly secured on a mounting bracket 13 of the main frame of the tractor by a plurality of bolts 27 or by welding. This base plate 25 carries a pair of identical parallel vertical mounting plates 26 which are formed integral with the base plate 25 or rigidly secured thereto by welding. The spacing between these mounting plates 26 is greater than the width of the side walls 20 of the housing 19 and greater than the length of the bushing 22, as shown in FIG. 2. The length of the sleeve 23 in the bushing 22 corresponds to the spacing between the plates 26.

The mounting bolt 24 is supported in this pair of mounting plates 26 and extends through a pair of horizontally aligned apertures for the bolt in these plates as shown. The height at which these apertures for the bolt in the mounting plates 26 are positioned above the top of the base plate 25 is greater than the distance between the bottom wall 21 of the housing 19 and the sleeve 23 in the bushing 22, thus causing the bottom wall 21 of the housing 19 to be spaced above the base plate 25, as shown in FIG. 3. Consequently the bushing 22 keeps the housing 19 spaced from the base plate 25 and mounting plates 26 so that there is no metal to metal contact between the two portions of the mounting assembly for the post 14. As apparent from FIGS. 2 and 3, the spacing surrounding the housing 19 and the resilient connection provided through the intermediary of the bushing 22 makes it possible for slight relative motion in any direction to take place between the base plate 25, and thus the tractor frame to which the base plate is rigidly secured, and the housing 19 and therewith the canopy post on which the housing 19 is rigidly secured.

With all four posts of the guard canopy frame secured in place on the tractor by such flexible mounting means, the slight twists or bends, to which the tractor frame must invariably be subjected at times under heavy duty, will be absorbed by the flexible mounts for the guard canopy posts, thus protecting the guard canopy frame from the effect of any such transmitted strains.

In the construction as shown in FIG. 1 each of the forward, downwardly sloping deflector bars 16 of the guard canopy 15 has a similar bushing-containing housing 19' secured to each end. U-shaped mounting brackets 28 and 29 are welded to the end of the main frame of the guard canopy and to a mount 17 on the engine housing 12 respectively for each of the deflector bars 16. The parallel side walls of these mounting brackets 28 and 29 support the mounting bolts for the respective ends of the deflector bars, the spacing within the mounting brackets being such as to allow ample clearance for the housings 19'.

In the modified construction illustrated in FIGS. 4 and 5 the arrangement of the two portions of the mounting assembly is somewhat reversed. Here the housing 30 for the resilient bushing 31, instead of being secured to the bottom of the guard canopy post, is secured to the base plate 32, the base plate in turn being bolted firmly to the tractor frame. The bolt mounting plates 33 in this case constitute the opposite side walls of a member 34 which encompasses the major portion of the housing 30, being shaped to correspond with the housing 30, but with its inside dimensions sufficiently larger than the outside dimensions of the housing 30 to enable the member 34 to extend down over the housing 30 and be spaced on all sides from the housing 30. The mounting bolt 35, mounted in the side plates or opposite side walls 33, has a sleeve 36 which extends through the resilient bushing 31 as before.

As apparent from FIG. 5, the distance at which each of the apertures for the bolt 35 is positioned above the bottom end of the member 34 is less than the height at which the bolt sleeve 36 and bushing channel are located above the base plate 32.

The member 34 is welded on, or formed as an integral part of the guard canopy post 37 as the case may be. This modified construction serves in the same manner as the construction shown in FIGS. 1, 2 and 3 to enable limited relative movement in any direction to take place between the rigidly mounted base plate 32 and the bottom of the guard canopy post.

This modified flexible mounting construction also can be used for tractor guard canopy frames which are formed of metal tubing which is circular in cross section as well as square cross section, and the tractor guard canopy post 37 indicated in part in FIG. 5 is shown thus as circular in cross section. In this instance the member 34, which is square cross section, has its inside dimension approximately the same as the exterior diameter of the post 37 and is rigidly secured on the post 37 by welding.

Further minor modifications in the construction and arrangement of the members of the flexible mounts for the guard canopy posts which I have described would be possible without departing from the principle of the invention.

I claim:

1. In combination with a tractor and a tractor guard canopy of the character described, a mounting assembly for flexibly securing a post of the guard canopy on the tractor, said assembly including a portion rigidly secured on said tractor, a cooperating portion rigidly secured on the bottom of said post, a mounting bolt connecting said portions together, a rigidly attached bushing housing in one of said assembly portions, said housing having a pair of substantially vertical spaced side walls with open sides between said walls, the top and bottom of said housing being closed, a resilient bushing secured in said housing, said bushing having a substantially central channel extending through said bushing and through the open sides of said housing, a pair of spaced, rigidly secured, bolt-supporting plates in the other of said assembly portions, the spacing between said plates being sufficient to enable said housing to be positioned in between said plates spaced from each plate, said mounting bolt having its ends firmly secured in said plates respectively, and said mounting bolt extending through said channel in said bushing, said plates and the positioning of said bolt in said plates being so arranged that said bushing housing and said first mentioned assembly portion will be held in spaced relationship with respect to said other assembly portion, whereby said bushing and said mounting bolt, by permitting limited relative movement in any direction of one assembly portion with respect to the other, will provide a flexible mounting for the guard canopy post on the tractor.

2. In combination with a tractor and a tractor guard canopy of the character described, a mounting assembly for flexibly securing a post of the guard canopy on the tractor, said assembly including a portion rigidly secured on said tractor, a cooperating portion rigidly secured on the bottom of said post, a mounting bolt connecting said portions together, a sleeve on said bolt, a rigidly attached bushing housing in one of said assembly portions, said housing having a pair of parallel spaced side walls with open sides between said walls, the top and bottom of said housing being closed, a resilient bushing secured in and filling said housing, said bushing having a horizontal substantially central channel extending through said bushing and through the open sides of said housing, a pair of spaced, substantially vertical, parallel, rigidly secured, bolt-supporting plates in the other of said assembly portions, the spacing between said plates being sufficient to enable said housing to be positioned in between said plates spaced from each plate, each of said plates having an aperture for said mounting bolt, said plate apertures being in substantial horizontal alignment, said mounting bolt having its ends firmly secured in said apertures of said plates respectively, said mounting bolt and said sleeve extending through said channel in said bushing, the ends of said sleeve extending beyond said bushing and the open sides of said housing and terminating at said bolt-supporting plates respectively, said plates and said apertures for said bolt in said plates being so arranged that said bushing housing and said first mentioned assembly portion will be held in spaced relationship with respect to said other assembly portion, whereby said bushing and said mounting bolt, by permitting limited relative movement in any direction of one assembly portion with respect to the other, will provide a flexible mounting for the guard canopy post on the tractor.

3. In combination with a tractor and a tractor guard canopy of the character described, a mounting assembly for flexibly securing a post of the guard canopy on the tractor, said assembly including a base plate rigidly secured on said tractor, a bushing housing rigidly secured on the bottom of said post, said housing having a pair of substantially vertical spaced side walls with open sides between said walls, the top and bottom of said housing being closed, a resilient bushing secured in and filling said housing, said bushing having a horizontal substantially central channel extending through said bushing and through the open sides of said housing, a pair of substantially vertical upwardly extending bolt-supporting plates secured on said base plate, said bolt-supporting plates spaced apart a distance sufficient to enable said housing to be positioned in between said bolt-supporting plates spaced from each bolt-supporting plate, a substantially horizontal mounting bolt having its ends secured in said bolt-supporting plates respectively, said bolt extending through said channel in said bushing, the distance at which said bolt is positioned above said base plate being greater than the distance from said bushing channel to the bottom of said housing, whereby limited relative movement in any direction of said base plate and said bolt-supporting plates with respect to said housing and said post will be possible.

4. In combination with a tractor and a tractor guard canopy of the character described, a mounting assembly for flexibily securing a post of the guard canopy on the tractor, said assembly including a base plate rigidly secured on said tractor, a bushing housing rigidly secured on said base plate, said housing having a pair of parallel spaced side walls with open sides between said walls, the top and bottom of said housing being closed, a resilient bushing secured in said housing, said bushing having a horizontal substantially central channel extending through said bushing and through the open sides of said housing, a pair of substantially vertical downwardly extending bolt-supporting plates secured on the bottom of said post, said bolt-supporting plates spaced apart a distance sufficient to enable said housing to be positioned in between said bolt-supporting plates spaced from each bolt-supporting plate, a substantially horizontal mounting bolt having its ends secured in said bolt-supporting plates respectively, said bolt extending through said channel in said bushing, the distance at which said bolt is positioned above the bottom ends of said bolt-supporting plates being less than the distance from said base plate to said channel in said bushing, whereby limited relative movement in any direction of said base plate and said bolt-supporting plates with respect to said housing and said post will be possible.

5. In combination with a tractor and a tractor guard canopy having a plurality of substantially vertical posts, a bracket for each guard canopy post rigidly mounted on the tractor, a mounting assembly flexibly securing each guard canopy post in position on the respective tractor frame bracket, each of said mounting assemblies including a portion rigidly secured on the tractor frame bracket, a cooperating portion rigidly secured on the bottom of the post, and a mounting bolt connecting the two portions of said assembly together, a sleeve on the bolt, a rigidly attached, substantially square bushing housing in one of said assembly portions, said housing having a pair of parallel spaced side walls with open sides between said walls, the top and bottom of said housing being closed, a resilient bushing secured in and filling said housing, said bushing having a horizontal substantially central channel extending through said bushing and through the open sides of said housing, a pair of spaced, substantially vertical, parallel, rigidly secured, bolt-supporting plates in the other of said assembly portions, the spacing between said plates being sufficient to enable said housing to be positioned in between said plates spaced from each plate, each of said plates having an aperture for receiving said mounting bolt, said plate apertures being in substantial horizontal alignment, said mounting bolt having its ends firmly secured in said apertures of said plates respectively, said mounting bolt and said sleeve extending through said channel in said bushing, the ends of said sleeve extending beyond said bushing and the open sides of said housing and terminating at said bolt-supporting plates respectively, said plates and said apertures for said bolt in said plates being so arranged that said bushing housing and said first mentioned assembly portion will be held in spaced relationship with respect to said other assembly portion, whereby said bushing and said mounting bolt, by permitting limited relative movement in any direction of one assembly portion with respect to the other, will provide a flexible mounting for the guard canopy post on the tractor, a pair of deflector bars extending downwardly and forwardly from the top of said guard canopy at the front to the front end of said tractor, a pair of brackets at the front end of said tractor for the front ends of said deflector bars respectively, mounting means located at both ends of each deflector bar for connecting the deflector bar with the top of said guard canopy and with the corresponding front end bracket on the front end of said tractor respectively, and at least one of said latter mentioned mounting means for each deflector bar comprising a flexible mounting assembly similar to said mounting assemblies for said posts of said tractor guard canopy.

References Cited in the file of this patent
UNITED STATES PATENTS

| | | |
|---|---|---|
| 2,805,887 | Selby | Sept. 10, 1957 |
| 2,864,574 | Van Ranst | Dec. 16, 1958 |